United States Patent
Nakasuga et al.

(10) Patent No.: US 11,673,994 B2
(45) Date of Patent: Jun. 13, 2023

(54) PHOTOSENSITIZER AND ACTIVE ENERGY RAY-CURABLE COMPOSITION

(71) Applicants: SEKISUI CHEMICAL CO., LTD., Osaka (JP); HIROSHIMA UNIVERSITY, Higashihiroshima (JP)

(72) Inventors: Akira Nakasuga, Osaka (JP); Hiroji Fukui, Osaka (JP); Takeharu Haino, Higashihiroshima (JP); Ryo Sekiya, Higashihiroshima (JP)

(73) Assignees: SEKISUI CHEMICAL CO., LTD., Osaka (JP); HIROSHIMA UNIVERSITY, Hiroshima (JP)

( * ) Notice: Subject to any disclaimer, the term of this patent is extended or adjusted under 35 U.S.C. 154(b) by 234 days.

(21) Appl. No.: 16/957,303

(22) PCT Filed: Feb. 1, 2019

(86) PCT No.: PCT/JP2019/003583
§ 371 (c)(1),
(2) Date: Jun. 23, 2020

(87) PCT Pub. No.: WO2019/155989
PCT Pub. Date: Aug. 15, 2019

(65) Prior Publication Data
US 2020/0385516 A1    Dec. 10, 2020

(30) Foreign Application Priority Data
Feb. 9, 2018   (JP) .............................. JP2018-022095

(51) Int. Cl.
C08G 59/68 (2006.01)
C01B 32/194 (2017.01)
C08G 59/24 (2006.01)

(52) U.S. Cl.
CPC .......... *C08G 59/686* (2013.01); *C01B 32/194* (2017.08); *C08G 59/245* (2013.01)

(58) Field of Classification Search
CPC ..... C08G 59/245; C08G 59/686; C01B 32/194
(Continued)

(56) References Cited

U.S. PATENT DOCUMENTS

2019/0001307 A1*   1/2019   Kinoshita .............. B01J 23/745

FOREIGN PATENT DOCUMENTS

| CN | 103819656 A | 5/2014 |
| CN | 107531489 A | 1/2018 |

(Continued)

OTHER PUBLICATIONS

Wei et al., CN 103819656 A machine translation in English, May 28, 2014 (Year: 2014).*

(Continued)

*Primary Examiner* — David T Karst
(74) *Attorney, Agent, or Firm* — Cheng Law Group, PLLC

(57) ABSTRACT

Provided is a photosensitizer that can make a compound having a polymerizable group be efficiently cured by irradiation with an active energy ray. A photosensitizer comprising graphene,
the graphene having a number average molecular weight (Mn) in terms of polystyrene of 500 or more and 1,000,000 or less,
the number average molecular weight measured by gel permeation chromatography.

9 Claims, 2 Drawing Sheets

(58) Field of Classification Search
USPC .......................................................... 522/25
See application file for complete search history.

(56) References Cited

FOREIGN PATENT DOCUMENTS

| | | | | |
|---|---|---|---|---|
| EP | 2 065 444 | A1 | | 6/2009 |
| JP | 11-263804 | A | | 9/1999 |
| JP | 2008-69259 | A | | 3/2008 |
| JP | 2012-51993 | A | | 3/2012 |
| JP | 2013006732 | A | * | 1/2013 ............ B82Y 30/00 |
| JP | 2015-134702 | A | | 7/2015 |
| WO | WO-2016158806 | A1 | * | 10/2016 ............ B01J 19/127 |

OTHER PUBLICATIONS

Tezuka et al., JP 2013-006732 A machine translation in English, Jan. 10, 2013 (Year: 2013).*

Kolay, Ankita et al., "New Antimony Selenide/Nickel Oxide Photocathode Boosts the Efficiency of Graphene Quantum-Dot Co-Sensitized Solar Cells", ACS Applied Materials & Interfaces, 2017, vol. 9, pp. 34915-34926.

International Search Report for the Application No. PCT/JP2019/003583 dated May 7, 2019.

Written Opinion of the International Searching Authority (PCT/ISA/237) for Application No. PCT/JP2019/003583 dated May 7, 2019.

Written Opinion of the International Searching Authority (PCT/ISA/237) for the CA Application No. PCT/JP2019/003583 dated May 7, 2019 (English Translation dated Aug. 20, 2020).

Georgakilas, Vasilios et al., "Noncovalent Functionalization of Graphene and Graphene Oxide for Energy Materials, Biosensing, Catalytic, and Biomedical Applications", Chemical Reviews, 2016, vol. 116, No. 9, pp. 5464-5519.

Nur, Iman Amir Muhammad et al., "$TiO_2$ hybrid photocatalytic systems: impact of adsorption and photocatalytic performance", Reviews in Inorganic Chemistry, 2015, vol. 35, No. 3, pp. 151-178.

Supplementary European Search Report for the Application No. EP 19 750 496.2 dated Nov. 16, 2021.

Taiwanese Office Action for the Application No. 108104281 dated Jul. 13, 2022.

* cited by examiner

[FIG. 1]
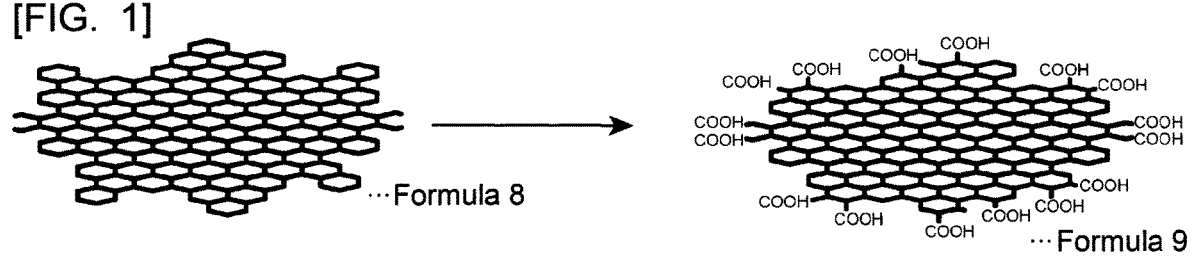
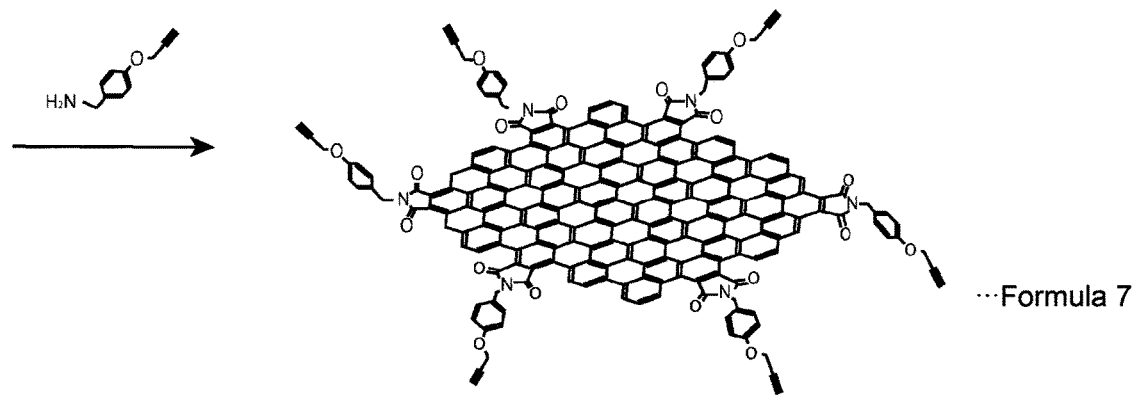
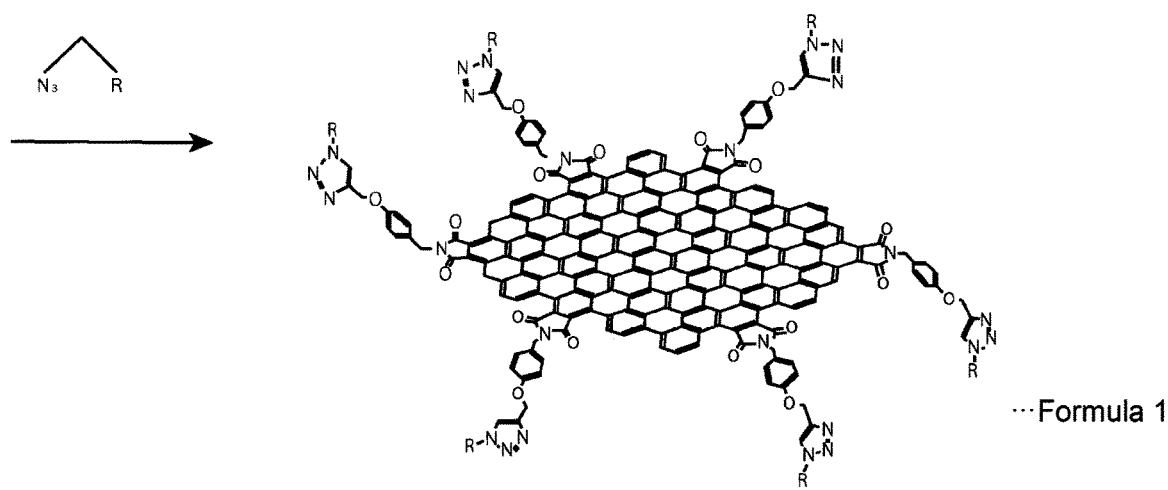

[FIG. 2]
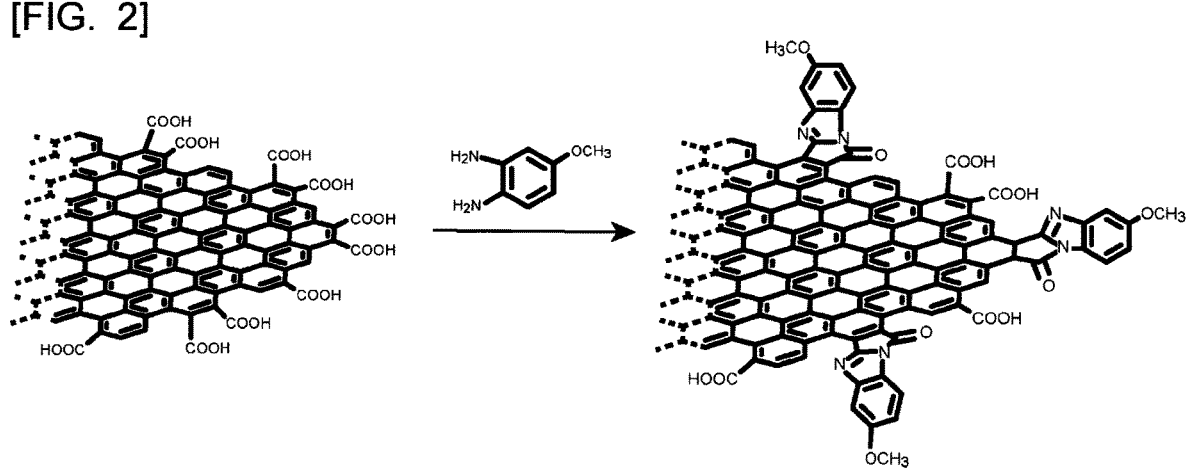

PHOTOSENSITIZER AND ACTIVE ENERGY RAY-CURABLE COMPOSITION

TECHNICAL FIELD

The present invention relates to a photosensitizer and an active energy ray-curable composition in which the photosensitizer is used.

BACKGROUND ART

Curable compositions have been conventionally known in which a compound having a polymerizable group is subjected to a chain reaction or a polymerization reaction by irradiation with an active energy ray such as ultraviolet rays or visible rays to cure the curable compositions. Such a curable composition does not need heat processing at the time of curing as compared with the case of a thermosetting composition, and sometimes does not need large-scale apparatus such as an oven and a heating furnace. In addition, since irradiation in the form of spots is possible, it is possible to irradiate a necessary spot with necessary light energy and to suppress the heat history during processing to the utmost. Furthermore, it is also possible to design a solventless curable composition in which no organic solvent is used and significantly reduce the use of the organic solvent. Therefore, it is possible to enhance the work efficiency and the productivity, improve the work environment, and reduce the environmental load.

As a curable composition that is cured by an active energy ray, Patent Document 1 described below discloses a photopolymerizable composition containing a compound having a cationically polymerizable group such as an epoxy compound, a photoacid generator, a benzoyl compound, and a thioxanthone sensitizer as essential components.

Patent Document 2 described below discloses a photocurable composition including a compound having a cationically polymerizable group, a diaryliodonium salt derivative that acts as a photocationic polymerization catalyst, a polycyclic aromatic compound having at least one of a hydroxyl group, an aralkyloxy group that may be substituted or an alkoxy group as a substituent, and a thioxanthone derivative. As the polycyclic aromatic compound, naphthalene derivatives and phenanthrene derivatives are described.

RELATED ART DOCUMENTS

Patent Documents

Patent Document 1: JP 2008-69259 A
Patent Document 2: JP H11-263804 A

SUMMARY OF THE INVENTION

Problems to be Solved by the Invention

As a light irradiation source for a curable composition that is cured by an active energy ray, energy-efficient LEDs have been recently attracting attention because of the narrow emission wavelength width, the little heat generation by infrared rays and the like, and the long life. Among the LEDs, ultraviolet LEDs are attracting attention as a light irradiation source for a photocurable ink-jet or a semiconductor-related resist. The center wavelength of the ultraviolet LEDs generally has an emission maximum at 365 nm or 385 nm corresponding to the emission wavelength of a mercury lamp. Whereas, the maximum absorption wavelength of generally used photoacid generators is only 300 nm or less, so that the curable composition needs to be irradiated with ultraviolet rays of 300 to 400 nm for a long time to be cured, or is not sensitized. Therefore, when the curable composition is photo-cured using an ultraviolet LED, it is necessary to use a photosensitizer in general.

When a thioxanthone compound or the like is used as the photosensitizer as in Patent Documents 1 and 2, however, the photosensitizing property at the time of curing is still insufficient. Therefore, it has been impossible to sufficiently increase the rate of curing a compound having a polymerizable group by irradiation with an active energy ray, and it has been difficult to efficiently cure a compound having a polymerizable group in a short time. In particular, the tendency is remarkable when an active energy ray in a long wavelength region such as a visible ray is used.

An object of the present invention is to provide a photosensitizer that can make a compound having a polymerizable group be efficiently cured by irradiation with an active energy ray and to provide an active energy ray-curable composition containing the photosensitizer.

Means for Solving the Problems

The photosensitizer according to the present invention includes graphene, the graphene having a number average molecular weight (Mn) in terms of polystyrene of 500 or more and 1,000,000 or less, the number average molecular weight measured by gel permeation chromatography.

In a specific aspect of the photosensitizer according to the present invention, the graphene has a surface modified with a functional group.

In another specific aspect of the photosensitizer according to the present invention, the functional group is an amine derivative.

In another specific aspect of the photosensitizer according to the present invention, the functional group has an aromatic ring or a heterocyclic ring including nitrogen.

In still another specific aspect of the photosensitizer according to the present invention, the functional group has a cyclic imide group.

In still another specific aspect of the photosensitizer according to the present invention, the functional group has a plurality of carbon-carbon double bonds (C=C).

In still another specific aspect of the photosensitizer according to the present invention, the functional group has an aromatic ring.

In still another specific aspect of the photosensitizer according to the present invention, the functional group includes at least one selected from the group consisting of a benzyl group, a hexadecyloxy group, a silsesqui group, and a polyalkoxybenzyl group.

In still another specific aspect of the photosensitizer according to the present invention, the functional group includes at least one selected from the group consisting of a bulky group having at least one dendrimer selected from the group consisting of 3,5-bis(benzyloxy)benzyl, 3,5-bis(3,5-bis(benzyloxy)benzyloxy)benzyl, and 3,5-bis(3,5-bis(3,5-bis(benzyloxy)benzyloxy)benzyloxy)benzyl, 3,4,5-tri(hexadecyloxy)benzyl, and polyhedral oligomeric silsesquioxane.

In a broad aspect of the active energy ray-curable composition according to the present invention, the active energy ray-curable composition includes a compound having a polymerizable group, a photoacid generator, and the photosensitizer configured according to the present invention. The compound having a polymerizable group is preferably a compound having a cationically polymerizable group. Furthermore, the compound having a cationically polymerizable group is preferably an epoxy resin.

In the active energy ray-curable composition according to the present invention, the photoacid generator is preferably a diaryliodonium salt-based compound.

In another broad aspect of the active energy ray-curable composition according to the present invention, the active energy ray-curable composition includes a compound having an active polymerizable group, a radical generator, and the photosensitizer configured according to the present invention. The polymerizable group is preferably a free radical polymerizable group. The free radical polymerizable group is more preferably a (meth)acryloyl group.

In the active energy ray-curable composition according to the present invention, the radical generator is preferably a diaryliodonium salt-based compound or an organic peroxide.

Effect of the Invention

According to the present invention, it is possible to provide a photosensitizer that can make a compound having a polymerizable group be efficiently cured by irradiation with an active energy ray and to provide an active energy ray-curable composition containing the photosensitizer.

BRIEF DESCRIPTION OF DRAWINGS

FIG. 1 is a view showing a reaction scheme for explaining an example of a method for producing graphene represented by Formulae 1 and 7.

FIG. 2 is a view showing a reaction scheme for explaining an example of a method for producing graphene modified with a functional group represented by Formula 14.

MODES FOR CARRYING OUT THE INVENTION

Hereinafter, details of the present invention will be described.

(Photosensitizer)

The photosensitizer according to the present invention includes graphene. The graphene has a number average molecular weight (Mn) of 500 or more and 1,000,000 or less. The number average molecular weight is a number average molecular weight in terms of polystyrene measured by gel permeation chromatography (GPC). The measurement can be performed at room temperature (23° C.) using tetrahydrofuran (THF) as an eluent.

The graphene may be a single-layer graphene sheet or a laminate of a plurality of graphene sheets. In the case of the laminate of a plurality of graphene sheets, the number of stacked graphene sheets can be, for example, 2 to 100. The graphene may be oxidized, may be a graphene oxide, or may be a reduced graphene oxide produced by reducing a graphene oxide.

Since the photosensitizer according to the present invention includes the graphene having a number average molecular weight within the above-mentioned range, the photosensitizing property can be enhanced at the time of curing a compound having a polymerizable group, and the curing rate can be increased. Therefore, the compound having a polymerizable group can be efficiently cured in a short time by irradiation with an active energy ray. Furthermore, since the graphene has a number average molecular weight equal to or more than the above-mentioned lower limit, the graphene is hardly sublimated, is prevented from being sublimated and inhaled at the time of work such as application, and is excellent in safety to a human body.

In the present invention, the graphene has a number average molecular weight of 500 or more and preferably 800 or more, and 1,000,000 or less, preferably 100,000 or less, more preferably 50,000 or less, still more preferably 10,000 or less, still even more preferably 5,000 or less, particularly preferably 3,000 or less, and most preferably 2,000 or less. When the graphene has a number average molecular weight equal to or more than the above-mentioned lower limit, the curing rate can be further increased at the time of curing the compound having a polymerizable group, and the safety to a human body can be further improved. When the graphene has a number average molecular weight equal to or less than the above-mentioned upper limit, the energy gap of the quantized graphene absorbs the emission wavelength of the light source, the sensitizing property is easily exhibited, and the curing rate can be further increased.

In the present invention, the shape of the graphene is not particularly limited, and examples of the shape include a sheet shape and a ribbon shape elongated in a plane direction. The word "plane direction" refers to a direction along the main surface of the graphene. Furthermore, there may be a gap such as a hole in the plane.

In the present invention, the graphene preferably has a dimension in the plane direction of 1 nm or more and more preferably 2 nm or more, and preferably 500 nm or less and more preferably 100 nm or less. The word "dimension in the plane direction" refers to the maximum dimension in the plane direction.

When the graphene has a dimension in the plane direction equal to or more than the above-mentioned lower limit, the curing rate can be further increased at the time of curing the compound having a polymerizable group, and the safety to a human body can be further improved. When the graphene has a dimension in the plane direction equal to or less than the above-mentioned upper limit, the electron donating property is further improved, and the curing rate can be further increased.

Furthermore, in the present invention, the graphene preferably has an aspect ratio of 3 or more and 330 or less. The aspect ratio is determined by dividing the maximum dimension of the graphene in the plane direction by the thickness of the graphene (the maximum dimension in the plane direction/the thickness).

The dimension in the plane direction and the aspect ratio of the graphene can be determined using, for example, an electron microscope or a scanning probe microscope (SPM).

Furthermore, in the present invention, the graphene preferably has a surface modified with a functional group. When the graphene is such a graphene derivative, the photosensitizing property can be further enhanced at the time of curing the compound having a polymerizable group, and the curing rate can be further increased. Therefore, the compound having a polymerizable group can be more efficiently cured by irradiation with an active energy ray. Note that in the present invention, such a graphene derivative having a surface modified with a functional group is sometimes collectively referred to as graphene. Furthermore, the graphene is not necessarily required to have a surface modified with a functional group.

The functional group is not particularly limited, and preferably includes a benzyl group, a hexadecyloxy group, a silsesqui group, or a polyalkoxybenzyl group. The functional groups may be used alone or in combination of two or more of the functional groups.

Examples of the functional group include an organic functional group being at least one selected from the group consisting of a bulky group having at least one dendrimer selected from the group consisting of 3,5-bis(benzyloxy)benzyl, 3,5-bis(3,5-bis(benzyloxy)benzyloxy)benzyl, and 3,5-bis(3,5-bis(3,5-bis(benzyloxy)benzyloxy)benzyloxy)benzyl, 3,4,5-tri(hexadecyloxy)benzyl, and polyhedral oligomeric silsesquioxane.

An example of the graphene having a surface modified with the functional group is represented by Formula 1 shown below. Note that in Formula 1, Formulae shown below, and drawings, a double bond in an aromatic ring included in the graphene is sometimes omitted.

[Chemical 1]

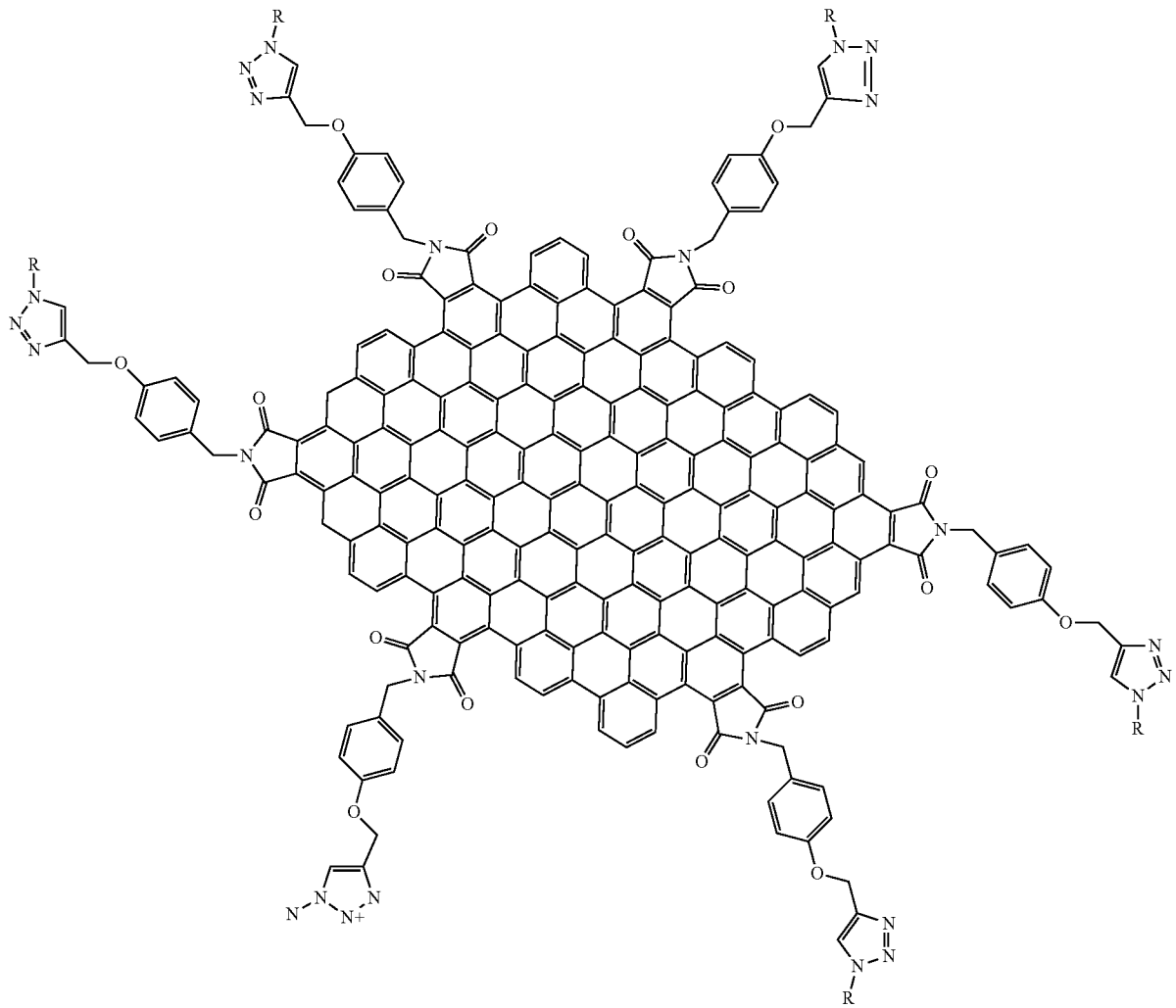

Formula 1

R in Formula 1 represents the functional group.

The functional group of each of the above-mentioned dendrimers is represented by Formulae 2 to 4 shown below. Formula 2 represents the 3,5-bis(benzyloxy)benzyl. Formula 3 represents the 3,5-bis(3,5-bis(benzyloxy)benzyloxy) benzyl. Formula 4 represents the 3,5-bis(3,5-bis(3,5-bis (benzyloxy)benzyloxy)benzyloxy)benzyl. Furthermore, the functional group in Formulae 2 to 4 shown below may be R in Formula 1, and may be bonded to the graphene represented by Formula 1 at the position indicated by a broken line.

[Chemical 2]
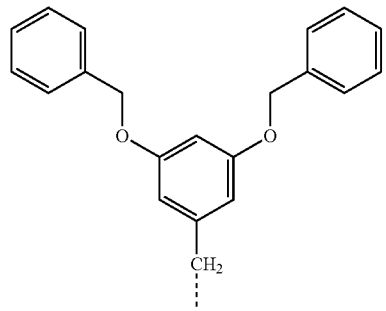
Formula 2
[Chemical 3]
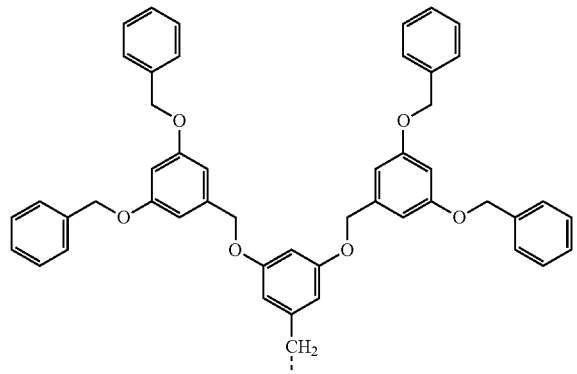
Formula 3
[Chemical Formula 4]
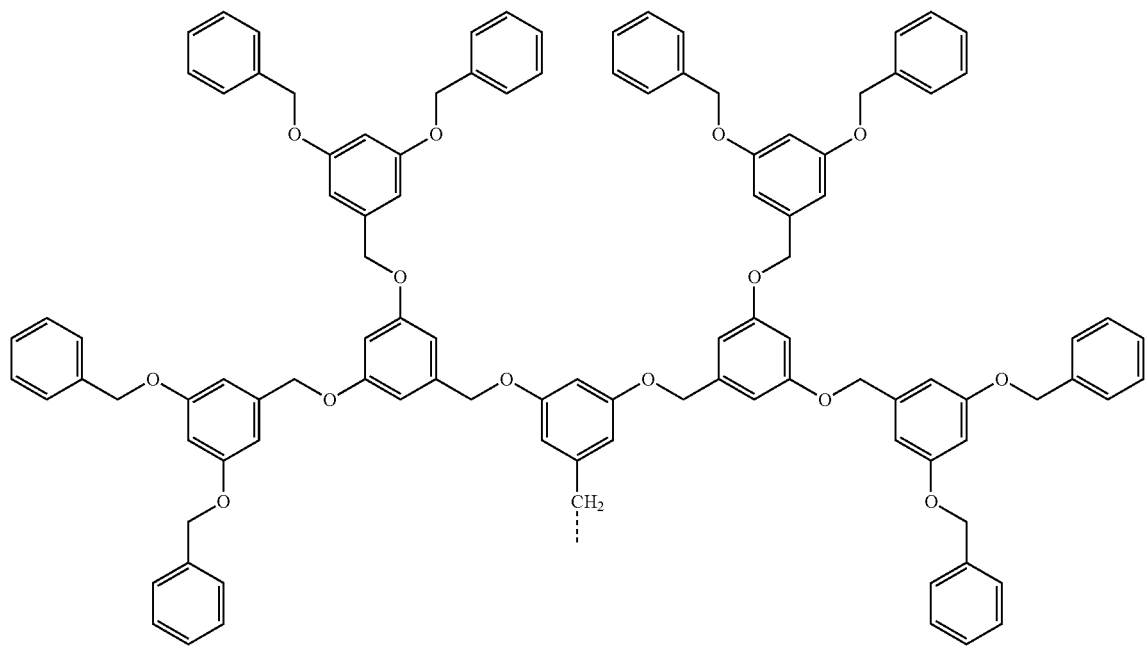
Formula 4

The functional group of the 3,4,5-tri(hexadecyloxy)benzyl is represented by Formula 5 shown below. Furthermore, the functional group in Formula 5 shown below may correspond to R in Formula 1, and may be bonded to the graphene represented by Formula 1 at the position indicated by a broken line.

[Chemical 5]

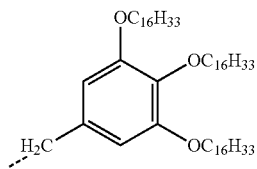

Formula 5

The functional group of the polyhedral silsesquioxane is represented by Formula 6 shown below. Furthermore, the functional group in Formula 6 shown below may correspond to R in Formula 1, and may be bonded to the graphene represented by Formula 1 at the position indicated by a broken line.

[Chemical 6]

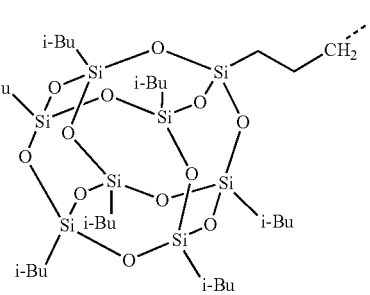

Formula 6

Alternatively, as shown in Formula 7 below, the terminal of the functional group of the graphene may be an alkyne.

[Chemical 7]

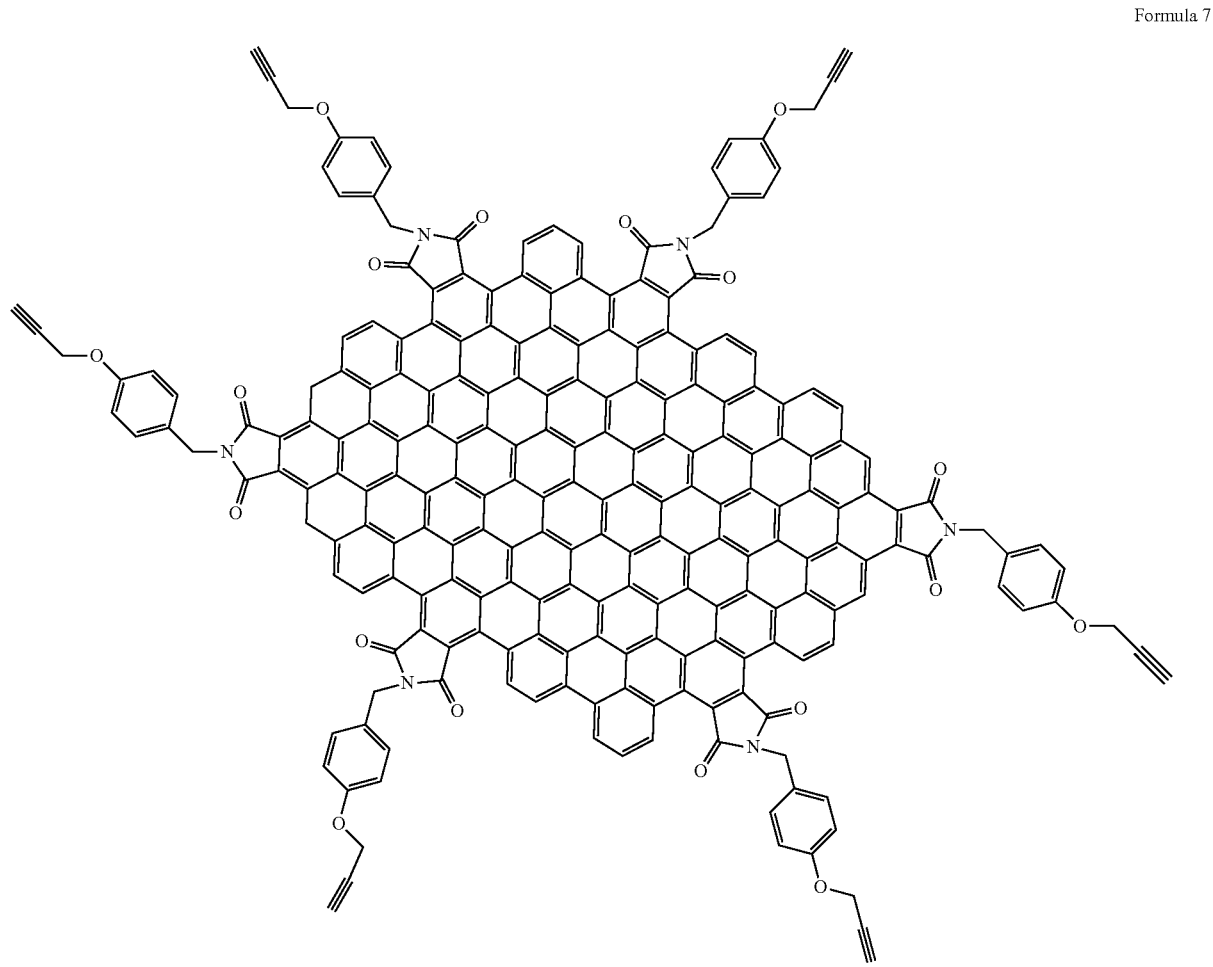

Formula 7

The graphene represented by Formulae 1 and 7 shown above can be produced, for example, in accordance with the method disclosed in JP 2015-134702 A.

The graphene can be specifically produced in accordance with the reaction scheme shown in FIG. 1. In order to obtain the graphene represented by Formulae 1 and 7, first, the graphite exemplified by Formula 8 in FIG. 1 is added to a mixed solution of concentrated sulfuric acid and nitric acid to oxidize the graphite. As a result, a carboxyl group that is an oxygen-containing functional group is introduced into the end face of the graphite to obtain the graphene having an oxidized end face as shown in Formula 9.

Next, the graphene represented by Formula 9 is dissolved in oxalyl chloride, and N,N-dimethylformamide is added to the solution to synthesize a carboxylic acid chloride. Next, the oxalyl chloride is removed, then, the residue is dissolved in N,N-dimethylformamide, and to the solution, 4-propynyloxybenzylamine, N,N-dimethyl-4-aminopyridine, and triethylamine are added. As a result, the carboxylic acid chloride is reacted with 4-propynyloxybenzylamine to obtain the graphene represented by Formula 7.

The graphene represented by Formula 7 can be purified by column chromatography with a particle-packed column using a mixed solvent of dichloromethane and ethyl acetate (polar solvent) as a mobile phase.

As the particle-packed column, for example, a column packed with a high-purity silica gel (a silica gel containing extremely small amount of a metal impurity) (for example, "silica gel for chromatography PSQ-100B" (trade name) manufactured by FUJI SILYSIA CHEMICAL LTD.) can be used.

Here, although graphene is generally dissolved only in a polar solvent such as water, the graphene represented by Formula 7 is soluble in a general organic solvent such as ethyl acetate, acetone, 1,2-dichloroethane, dichloromethane, tetrahydrofuran, or acetonitrile.

By reacting the graphene represented by Formula 9 with 4-propynyloxybenzylamine, a part of the end face is covered with a 4-propynyloxybenzyl group. It is considered that the part of the 4-propynyloxybenzyl group prevents self-aggregation and protects the carbon surface of SP2 sterically by the n-n stacking interaction.

There are two types of end faces of graphene, that is, "armchair-shaped" and "zigzag-shaped" end faces. The graphene obtained by the above-mentioned method mainly has an armchair-shaped end face, so that the end face has a five-membered ring phthalimide structure.

Next, the graphene represented by Formula 7 and the acid azide that is a nitrogen compound having an R group represented by Formulae 2 to 6 (for example, 3,5-bis(benzyloxy)benzylazide in Formula 2) are dissolved in chloroform to obtain a solution. To the solution, triphenylphosphine copper bromide (CuBr(PPh$_3$)$_3$) that acts as a catalyst is added, and a Huisgen cycloaddition reaction (cyclization reaction with an alkyne and a nitrogen compound) is performed. As a result, the graphene represented by Formula 1 shown above can be obtained.

The graphene represented by Formula 1 can be purified by column chromatography with a particle-packed column using acetone or hexane as a mobile phase. The structure of each graphene can be identified by comparing the graphene with a model compound having a similar structure using $^1$H-NMR, IR spectrum, and the like.

The functional group is preferably an amine derivative. The word "amine derivative" refers to a functional group in which a hydrogen atom of an amino group (—NH$_2$) is substituted with another component, and the component may be aliphatic or aromatic. Furthermore, the functional group preferably includes a plurality of carbon-carbon double bonds (C=C). Furthermore, the functional group preferably includes one or more aromatic rings. As a result, an electron can be more suitably transferred.

Furthermore, the functional group preferably has an aromatic ring or a heterocyclic ring including nitrogen. The functional group may have an imide group being cyclic.

Examples of the graphene having a surface modified with an imide group being cyclic, that is, a functional group having a cyclic imide group include graphene represented by Formula 10 shown below.

[Chemical 8]

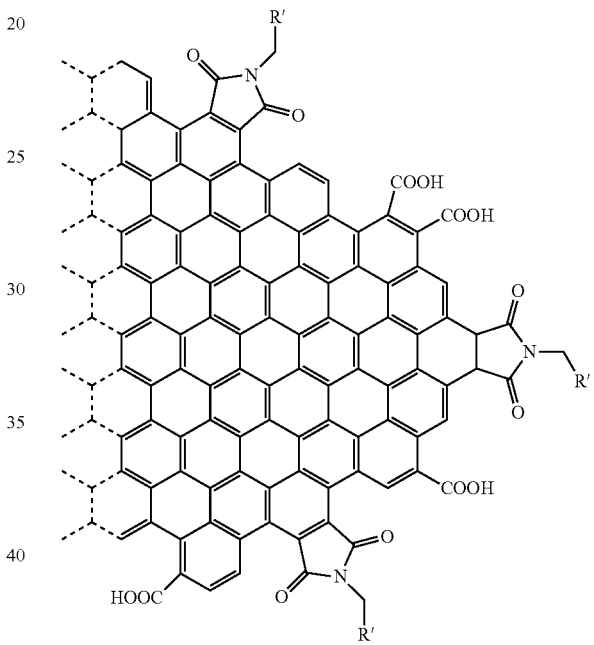

Formula 10

In Formula 10, R' represents, for example, a group represented by Formulae 11 to 13 shown below.

[Chemical 9]

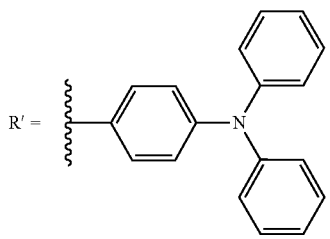

Formula 11

[Chemical 10]

Formula 12

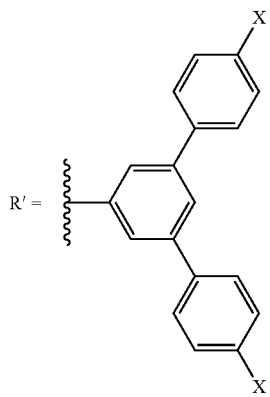

In Formula 12, X represents a hydrogen atom (H), a methoxy group (OCH$_3$), a trifluoromethyl group (CF$_3$), or an alkyl group. Furthermore, the bonding position of X may be any one of the ortho position, the meta position, and the para position. The para position is preferable. The number of X may be one or more.

[Chemical 11]

Formula 13

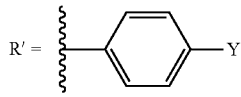

In Formula 13, Y represents a hydrogen atom (H), a methoxy group (OCH$_3$), a trifluoromethyl group (CF$_3$), or an alkyl group. Furthermore, the bonding position of Y may be any one of the ortho position, the meta position, and the para position. The para position is preferable. The number of Y may be one or more.

In this case, a specific example of the graphene represented by Formula 10 shown above may be a compound represented by Formula 13A shown below. In Formula 13, OMe is a methoxy group. Although all the carboxylic acid groups are substituted in Formula 13A, some carboxylic acid groups may be substituted and the other carboxylic acid groups may remain as in Formula 10. Therefore, also in Formula 13A, some carboxylic acid groups may remain as in Formula 10.

[Chemical 12]

Formula 13A

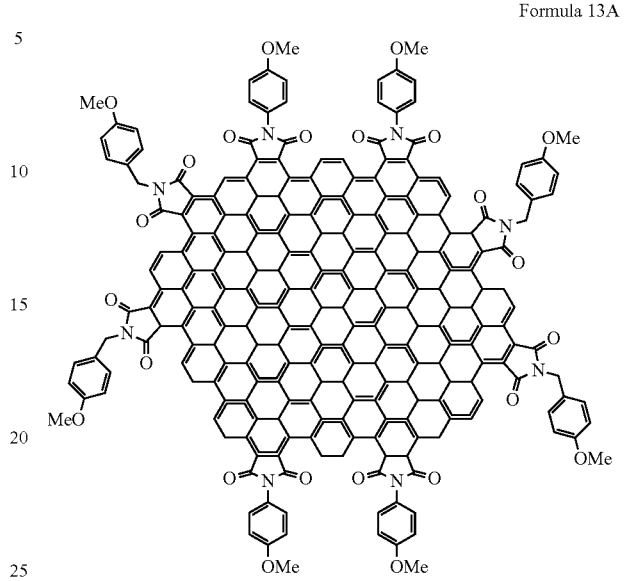

The graphene may have a surface modified with the functional group represented by Formula 14 shown below.

[Chemical 13]

Formula 14

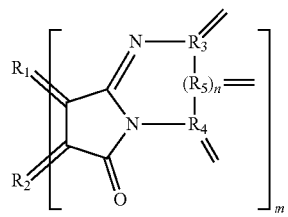

In Formula 14 shown above, $R_1$ and $R_2$ represent carbon derived from an aromatic ring in the graphene. Therefore, $R_1$ and $R_2$ are not included in the functional group, that is, the graphene including $R_1$ and $R_2$ is provided. $R_3$ to $R_5$ represent carbon derived from an aromatic ring or a heterocyclic ring in a group having the aromatic ring or the heterocyclic ring. That is, the group having the aromatic ring or the heterocyclic ring including $R_3$ to $R_5$ is provided. n represents 0 or 1. Therefore, it is not required to provide $R_5$. In addition, m means the number of the functional groups. The number of the functional groups m is preferably 5 or more and more preferably 10 or more, and preferably 50 or less and more preferably 40 or less. When the number of the functional groups m is equal to or more than the above-mentioned lower limit, by transferring an electron between the functional groups and the graphene, the electron density can be further greatly changed. When the number of the functional groups m is equal to or less than the above-mentioned upper limit, an electron is hardly transferred and the band gap is further widened.

Examples of the functional group represented by Formula 14 in which n=0 include the functional group represented by Formula 15 shown below.

[Chemical 14]

Formula 15

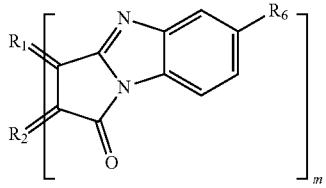

In Formula 15, $R_1$ and $R_2$ represent carbon derived from an aromatic ring in the graphene in the same manner as described above. $R_6$ represents a hydrogen atom, an alkyl group having 1 to 20 carbon atoms, an alkoxy group (in which the alkyl group has 1 to 20 carbon atoms), a cyano group, a nitro group, an amino group, or an acylamino group. In addition, m represents the number of the functional groups in the same manner as described above.

Specifically, when $R_6$ represents a hydrogen atom, the functional group is a [d]9H-9-Oxo-benzo[4,5]imidazo[2,1-a]pyrro group. Specifically, the graphene is represented by Formula 16 shown below.

[Chemical 15]

Formula 16

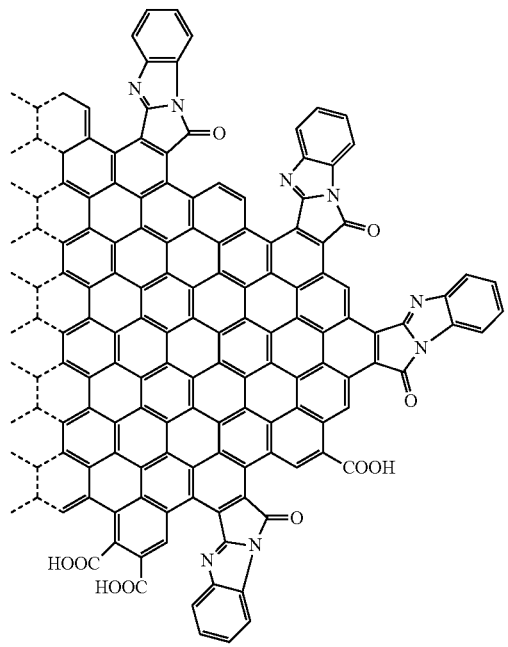

Furthermore, when $R_6$ represents a methoxy group (OCH$_3$), the graphene is represented by Formula 17 shown below.

[Chemical 15]

Formula 17

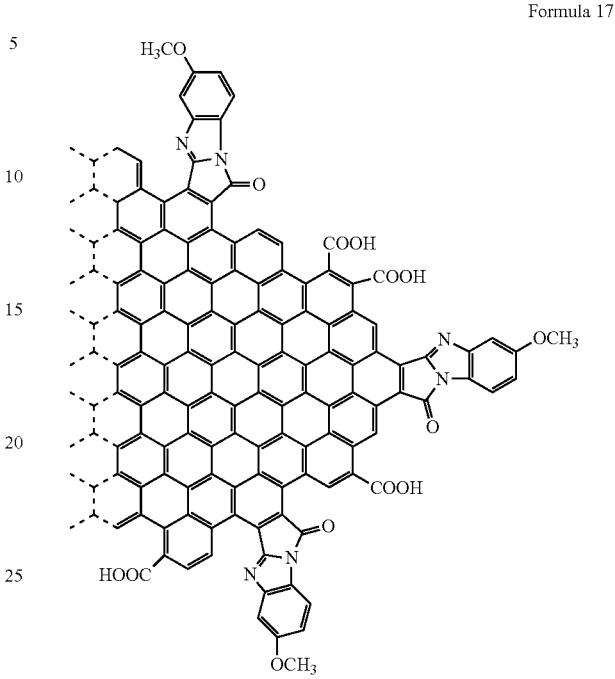

Furthermore, examples of the functional group represented by Formula 14 in which n=1 include the functional group represented by Formula 18 shown below.

[Chemical 17]

Formula 18

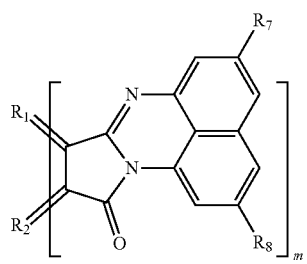

In Formula 18, $R_1$ and $R_2$ represent carbon derived from an aromatic ring in the graphene in the same manner as described above. $R_7$ and $R_8$ represent a hydrogen atom, an alkyl group having 1 to 20 carbon atoms, an alkoxy group (in which the alkyl group has 1 to 20 carbon atoms), a cyano group, a nitro group, an amino group, or an acylamino group. In addition, m represents the number of the functional groups in the same manner as described above.

Specifically, when $R_7$ and $R_8$ represent a hydrogen atom, the functional group is a [d]11H-11-Oxo-Perimidino[2,1-a]pyrro group. That is, the graphene is represented by Formula 19 shown below.

[Chemical 15]

[Chemical 18]

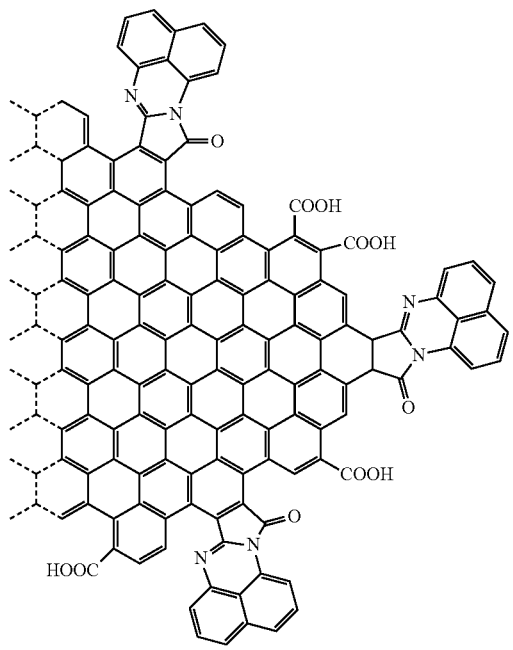

The graphene modified with the functional group represented by Formula 14 shown above can be obtained, for example, in accordance with the reaction scheme shown in FIG. 2. Here, the graphene represented by Formula 17 will be described as an example. As shown in FIG. 2, first, graphene including an aromatic ring having two carboxyl groups is prepared. The aromatic ring preferably has the two carboxyl groups at the ortho position. As such graphene including an aromatic ring having two carboxyl groups, a graphene oxide, a graphene oxide laminate, and the like can be used. The graphene oxide and the graphene oxide laminate may be used after being cut by oxidation. The graphene oxide and the graphene oxide laminate can be produced by a conventionally known method for producing such as the Hummers method.

Meanwhile, a compound having an aromatic ring or a heterocyclic ring substituted by at least two amino groups is prepared. When the compound has a plurality of aromatic rings or heterocyclic rings, one aromatic ring or heterocyclic ring may be substituted by at least two amino groups, or two or more aromatic rings or heterocyclic rings may be substituted by at least two amino groups.

As such a compound, for example, diamines such as 1,2-diaminobenzene, 4-methoxy-1,2-diaminobenzene, 4-cyano-1,2-diaminobenzene, 4-nitro-1,2-diaminobenzene, naphthalene-1,8-diamine, phenanthrene-9,10-diamine and pyrene-4,5-diamine, 2,4-diaminopyridine, and 3,4-diaminothiophene can be used.

Next, as shown in FIG. 2, the graphene including an aromatic ring having two carboxyl groups is reacted with the compound having an aromatic ring or a heterocyclic ring substituted by at least two amino groups. As a result, the graphene shown above can be obtained. The above-mentioned reaction can be performed, for example, in the presence of oxalyl chloride, dimethyl sulfoxide, triethylamine, or the like.

Next, the graphene including an aromatic ring having two carboxyl groups and oxalyl chloride are heated at, for example, 60° C. for 4 days. At this time, a catalytic amount of N,N-dimethylformamide is added. The oxalyl chloride is removed, then, the graphene including the aromatic ring having the carboxyl group converted to an acid chloride is dissolved in N,N-dimethylformamide, and triethylamine and a catalytic amount of N,N-dimethyl-4-aminopyridine are added. Then, the compound having an aromatic ring or a heterocyclic ring substituted by at least two amino groups is added. The solution is stirred at 80° C. for 4 days. The solvent is removed, and then the resulting product is purified with biobeads using tetrahydrofuran as a developing solvent to obtain the target graphene.

The production of the graphene can be confirmed using, for example, a Fourier transform infrared spectrophotometer (FT-IR), a Raman spectrophotometer, a transmission electron microscope, or a nuclear magnetic resonance (NMR) device.

Furthermore, although a carbon material is generally dissolved only in a polar solvent such as water, the graphene represented by Formulae 1, 7, 10, 13 to 19, or the like is soluble in a general organic solvent such as ethyl acetate, acetone, 1,2-dichloroethane, dichloromethane, tetrahydrofuran (THF), chloroform, or acetonitrile. In particular, when soluble in THF or chloroform, the graphene according to the present invention can be further easily obtained because the graphene having a specific number average molecular weight can be fractionated by gel permeation chromatography (GPC). Therefore, the graphene according to the present invention is preferably soluble in THF or chloroform.

Specifically, in the method of fractionating graphene having a specific number average molecular weight by GPC, first, an eluate obtained using a GPC device with, for example, tetrahydrofuran as a mobile phase is fractionated by a fraction collector or the like. At this time, the fractions corresponding to the desired molecular weight portion in the whole integral of the elution curve are collected. Then, each fractionated eluate is dried using an evaporator or the like to obtain the graphene having a desired number average molecular weight.

As the GPC device, for example, a gel permeation chromatography measuring device and a detector equipped with a refractive index (RI) detector, an ultraviolet ray detector, or a PDA (Photodiode Array) detector can be used. In determining the molecular weight in terms of polystyrene, a standard curve is determined using standard polystyrene having a known molecular weight to calculate the molecular weight. The measurement by GPC can be performed at room temperature (23° C.)

(Active Energy Ray-Curable Composition)

The active energy ray-curable composition according to the present invention contains a compound having a polymerizable group, a polymerization initiator, and the above-described photosensitizer. The active energy ray-curable composition according to the present invention can be easily cured by irradiation with an active energy ray. In particular, since the curable composition according to the present invention contains the above-described photosensitizer having an excellent photosensitizing property, the curing rate by irradiation with an active energy ray can be increased, and the curable composition can be efficiently cured in a short time. Furthermore, since the active energy ray-curable composition according to the present invention contains the photosensitizer having an excellent photosensitizing property, it is possible to reduce a component such as a polymerization initiator or a photosensitizer that does not contribute to a curing component, and it is also possible to enhance the mechanical strength, the durability, the adhesion, and the like of the cured product obtained by curing the active energy ray-curable composition.

Examples of the active energy ray include ultraviolet rays, visible rays, and electron rays. Since the active energy ray-curable composition according to the present invention contains the above-described photosensitizer, the active energy ray-curable composition can be efficiently cured by not only ultraviolet rays but also visible rays and the like having a longer wavelength.

The light source used for the irradiation with an active energy ray is not particularly limited, and for example, a light source having a light emission distribution in a range of 300 to 800 nm is preferable. Examples of such light source include low-pressure mercury lamps, medium-pressure mercury lamps, high-pressure mercury lamps, ultra-high-pressure mercury lamps, chemical lamps, black light lamps, microwave-excited mercury lamps, metal halide lamps, sodium lamps, fluorescent lamps, halogen lamps, and LEDs.

Since the active energy ray-curable composition according to the present invention can be efficiently cured by irradiation with an active energy ray, the active energy ray-curable composition can be suitably used in inks for an ink-jet, semiconductor-related resists, adhesives, inks/paints, coating materials, sealing materials, potting materials, and the like.

Hereinafter, details of each material included in the active energy ray-curable composition according to the present invention will be described.

Compound Having Polymerizable Group;

The compound having a polymerizable group is thickened/crosslinked or cured through a chain reaction or a polymerization reaction caused by reaction initiators such as a photosensitizer and photoacid generator in the composition that are activated by irradiation with an active energy ray.

As the compound having a polymerizable group, for example, compounds having a cationically polymerizable group, compounds having an anionically polymerizable group, and compounds having a radically polymerizable group can be used. The compound having a cationically polymerizable group is not particularly limited, and monomers, oligomers, and polymers having a cationically polymerizable group, and mixtures of a plurality of the compounds can be used.

The cationically polymerizable group is not particularly limited, and examples thereof include a vinyloxy group, a styryl group, an epoxy group, an oxetanyl group, an alkoxysilyl group, and a Spiro orthoester group.

Examples of the compound having a cationically polymerizable group including a vinyloxy group include vinyl compounds such as n-propyl vinyl ether, n-butyl vinyl ether, isobutyl vinyl ether, tert-butyl vinyl ether, tert-amyl vinyl ether, cyclohexyl vinyl ether, 2-ethylhexyl vinyl ether, dodecyl vinyl ether, octadecyl vinyl ether, 2-chloroethyl vinyl ether, ethylene glycol butyl vinyl ether, triethylene glycol methyl vinyl ether, (4-vinyloxy)butyl benzoate, ethylene glycol divinyl ether, diethylene glycol divinyl ether, triethylene glycol divinyl ether, tetraethylene glycol divinyl ether, butane-1,4-diol-divinyl ether, hexane-1,6-diol-divinyl ether, cyclohexane-1,4-dimethanol-divinyl ether, di(4-vinyloxy)butyl isophthalate, di(4-vinyloxy)butyl glutarate, di(4-vinyloxy)butyl succinate trimethylolpropane trivinyl ether, 2-hydroxyethyl vinyl ether, 4-hydroxybutyl vinyl ether, 6-hydroxyhexyl vinyl ether, cyclohexane-1,4-dimethanol-monovinyl ether, diethylene glycol monovinyl ether, 3-aminopropyl vinyl ether, 2-(N,N-diethylamino)ethyl vinyl ether, urethane vinyl ether, and polyester vinyl ether.

Examples of the compound having a cationically polymerizable group including a styryl group include vinyl compounds such as styrene, p-methylstyrene, α-methylstyrene, p-methoxystyrene, p-tert-butoxystyrene, p-chloromethylstyrene, p-acetoxystyrene, and divinylbenzene.

Examples of the compound having a cationically polymerizable group having an epoxy group include epoxy compounds such as bisphenol A-based epoxy resins, hydrogenated bisphenol A-based epoxy resins, bisphenol A-based epoxy resins, novolak epoxy resins, aliphatic cyclic epoxy resins, brominated epoxy resins, rubber-modified epoxy resins, urethane-modified epoxy resins, glycidyl ester-based compounds, epoxidized polybutadiene, epoxidized styrene-butadiene-styrene copolymers, and epoxidized soybean oils.

Examples of the compound having a cationically polymerizable group having an oxetanyl group include oxetane compounds such as 3,3-dimethyloxetane, 3,3-bis(chloromethyl)oxetane, 2-hydroxymethyloxetane, 3-methyl-3-oxetanemethanol, 3-methyl-3-methoxymethyloxetane, 3-ethyl-3-phenoxymethyloxetane, resorcinolbis(3-methyl-3-oxetanylethyl)ether, and m-xylylenebis(3-ethyl-3-oxetanylethyl ether).

The compounds having a cationically polymerizable group exemplified above may be used alone or in combination of two or more of the compounds.

The content of the compound having a cationically polymerizable group in 100% by weight of the active energy ray-curable composition is not particularly limited, and can be preferably 70% by weight or more and more preferably 85% by weight or more, and preferably 99.9% by weight or less and more preferably 99.5% by weight or less. When the content of the compound having a cationically polymerizable group is equal to or more than the above-mentioned lower limit, the curability can be further improved, and the mechanical strength of the cured product can be further enhanced. When the content of the compound having a cationically polymerizable group is equal to or less than the above-mentioned upper limit, the curing rate by irradiation with an active energy ray can be further increased, and the compound can be further efficiently cured.

The radically polymerizable group is not particularly limited, and examples of the radically polymerizable group include an ethynyl group, an allyl group, a propenyl group, an acetyl group, an acryloyl group, a (meth)acryloyl group, a styryl group, a vinyloxy group, and a vinyl ester group. Among the radically polymerizable groups, the (meth)acryloyl group is preferable from the viewpoint of the further increased reactivity. In the present specification, the word "(meth)acryloyl" refers to "acryloyl" or "methacryloyl". At least one radically polymerizable group is required to be included in one molecule, and a plurality of radically polymerizable groups are preferably included.

Examples of the compound having a radically polymerizable group include (meth)acrylic acid and esters of (meth)acrylic acid such as (meth)acrylic acid, methyl (meth)acrylate, ethyl (meth)acrylate, butyl (meth)acrylate, and 2-ethylhexyl (meth)acrylate. As other vinyl monomers, vinyl monomers such as vinyl chloride, vinylidene chloride, vinyl acetate, methyl vinyl ether, styrene, and divinylbenzene, and compounds having an unsaturated double bond such as isoprene may be used. Furthermore, as other vinyl monomers, (meth)acrylamide, (meth)acrylamide derivatives such as isopropylacrylamide, (meth)acrylonitrile, (meth)acryloylmorpholine, N-vinyl-2-pyrrolidone, vinylpyridine, N-vinylcarbazole, (meth)acrylamide, N,N-dimethylacrylamide, N,N-diethylacrylamide, isopropylacrylamide, hydroxyethylacrylamide, and dimethylaminopropylacrylamide may be used.

Examples of the compound having a plurality of radically polymerizable groups in one molecule include trimethylolpropane tri(meth)acrylate, pentaerythritol tri(meth)acrylate, polyethylene glycol di(meth)acrylate, polypropylene glycol di(meth)acrylate, polytetramethylene glycol di(meth)acrylate, and divinylbenzene. Among the compounds, trimethylolpropane tri(meth)acrylate is preferable from the viewpoints of further increasing the curing rate by irradiation with an active energy ray and further efficiently curing the compound.

The compounds having a radically polymerizable group may be used alone or in combination of two or more of the compounds.

The content of the compound having a radically polymerizable group in 100% by weight of the active energy ray-curable composition is not particularly limited, and is preferably 20% by weight or more and more preferably 50% by weight or more, and preferably 99.9% by weight or less and more preferably 98% by weight or less. When the content of the compound having a radically polymerizable group is within the above-mentioned upper limit range, it is possible to further efficiently cure the molded product obtained by irradiation with light to a deep portion.

Polymerization Initiator;

As the polymerization initiator, a photoacid generator or a photobase generator that is a photopolymerization initiator, and a radical generator can be used. When the compound having a polymerizable group has a cationically polymerizable group, the photoacid generator is preferably used. Note that a thermal polymerization initiator may be used, or a photopolymerization initiator and a thermal polymerization initiator may be used in combination.

Examples of the photoacid generator include diaryliodonium salt-based compounds and triarylsulfonium salt-based compounds. The diaryliodonium salt-based compounds may be used as a photoradical generator described below.

As a commercially available photoacid generator, (tolylcumyl)iodonium tetrakis(pentafluorophenyl)borate (BLUESIL PI2074, manufactured by Bluestar Silicones), bis[4-n-alkyl($C_{10}$-$C_{13}$)phenyl]iodonium hexafluoro antimonate (WPI116, manufactured by Wako Pure Chemical Industries, Ltd.), or bis[4-n-alkyl($C_{10}$-$C_{13}$)phenyl]iodonium tetrakis(pentafluorophenyl)borate (WPI124, manufactured by Wako Pure Chemical Industries, Ltd.) may be used.

The content of the photoacid generator in 100% by weight of the active energy ray-curable composition is not particularly limited, and can be preferably 0.05% by weight or more and more preferably 0.1% by weight or more, and preferably 10% by weight or less and more preferably 5% by weight or less. When the content of the photoacid generator is equal to or more than the above-mentioned lower limit, the curing rate by irradiation with an active energy ray can be further increased, and the compound can be further efficiently cured. When the content of the photoacid generator is equal to or less than the above-mentioned upper limit, the curability can be further improved, and the mechanical strength of the cured product can be further enhanced.

The thermal polymerization initiator is not particularly limited, and for example, a thermal acid generator can be used.

Examples of the radical generator include a photoradical generator and a thermal radical generator.

Examples of the photoradical generator include diaryliodonium salt-based compounds.

Examples of the thermal radical generator include organic peroxides and polysulfides. Among them, the organic peroxides are preferable.

The organic peroxides are not particularly limited, and examples of the organic peroxides include benzoyl peroxide, diisopropyl peroxycarbonate, dioctyl peroxydicarbonate, t-butyl peroxylaurate, lauroyl peroxide, dioctanoyl peroxide, hydrogen peroxide, acetyl peroxide, cumyl peroxide, t-butyl peroxide, propionyl peroxide, benzoyl peroxide, chlorobenzoyl peroxide, dichlorobenzoyl peroxide, bromomethylbenzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, t-butyl hydroperoxide pertriphenylacetate, t-butyl performate, t-butyl peracetate, t-butyl perbenzoate, t-butyl perphenyl acetate, t-butyl permethoxyacetate, t-butyl per-N-(3-toluyl)carbamate, ammonium bisulfate, and sodium bisulfate.

The polysulfides are not particularly limited, and examples of the polysulfides include sulfur compounds such as 2-mercaptobenzothiazole, dibenzothiazyl disulfide, and trimethylolpropane tris(3-mercaptopropionate).

The thermal radical generators may be used alone or in combination of two or more of the thermal radical generators.

The content of the thermal radical generator is not particularly limited, and is preferably 0.05 parts by weight or more and preferably 10 parts by weight or less based on 100 parts by weight of the total amount of the active energy ray-curable composition. When the content of the thermal radical generator is less than the above-mentioned lower limit, the radical polymerization of the compound having a radically polymerizable functional group sometimes does not proceed. When the content of the thermal radical generator is more than the above-mentioned upper limit, the thermal radical generator is activated by the heat of the polymerization reaction of the compound having a radically polymerizable functional group, the reaction proceeds, and the storage stability is sometimes adversely affected.

The radical generator preferably contains the above-described diaryliodonium salt-based compound.

Photosensitizer;

The photosensitizer is configured according to the present invention described above.

The content of the photosensitizer in 100% by weight of the active energy ray-curable composition is not particularly limited, and can be preferably 0.005% by weight or more, and preferably 5% by weight or less and more preferably 1% by weight or less. When the content of the photosensitizer is equal to or more than the above-mentioned lower limit, the curing rate by irradiation with an active energy ray can be further increased, and the compound can be further efficiently cured. When the content of the photosensitizer is equal to or less than the above-mentioned upper limit, the curability can be further improved, and the mechanical strength of the cured product can be further enhanced.

In the compound having a polymerizable group according to the present invention, the photosensitizer is preferably used alone, but in addition to the photosensitizer, another curing accelerator may be used in combination.

Examples of another curing accelerator include amine adduct compounds, tertiary amines, phosphines, and alcohols.

Furthermore, another photosensitizer can be used in combination.

The word "another photosensitizer" refers to a substance that is excited by irradiation with light and induces the decomposition of the thermal radical generator by the photosensitizing action of the excited photosensitizer at a 10 hour half-life decomposition temperature or less. Examples of the light include infrared rays, visible rays, and ultraviolet rays.

Another photosensitizer is not particularly limited, and examples of another photosensitizer include benzophenone derivatives, thioxanthone derivatives, anthraquinone derivatives, anthracene derivatives, and benzoin derivatives. Among the derivatives, another photosensitizer is preferably a benzophenone derivative, a thioxanthone derivative, or an anthraquinone derivative. Among the derivatives, another photosensitizer is more preferably the thioxanthone derivative from the viewpoints of the sensitizing ability in a visible light region and the solubility in the compound having a radically polymerizable functional group. Another photosensitizer may be used alone or in combination of two or more of the photosensitizers.

Examples of the benzophenone derivative include benzophenone, p,p'-aminobenzophenone, 2-hydroxy-4-alkoxybenzophenone, p,p'-tetramethyldiaminobenzophenone, and p,p'-tetraethylaminobenzophenone.

Examples of the benzoin derivative include benzoin, benzoin ether benzoin ethyl ether, and benzoin-i-butyl ether.

The content of another photosensitizer is not particularly limited, and is preferably 0.01 parts by weight or more and more preferably 0.05 parts by weight or more, and preferably 5 parts by weight or less and more preferably 2 parts by weight or less based on 100 parts by weight of the total amount of the active energy ray-curable composition. When the content of another photosensitizer is equal to or more than the above-mentioned lower limit, the curing rate by irradiation with an active energy ray can be further increased, and the compound can be further efficiently cured. When the content of another photosensitizer is equal to or less than the above-mentioned upper limit, the curability can be further improved, and the mechanical strength of the cured product can be further enhanced.

Another Additive;

The active energy ray-curable composition according to the present invention may contain another additive as long as the effect of the present invention is not impaired.

Examples of another additive include additives such as antioxidants, ultraviolet absorbers, metal harm inhibitors, flame retardants, inorganic fillers, antistatic agents, stabilizers, pigments, and dyes. Examples of the antioxidants include phenol-based, phosphorus-based, amine-based, and sulfur-based antioxidants. Examples of the ultraviolet absorbers include benzotriazole-based and hydroxyphenyltriazine-based ultraviolet absorbers. Examples of the flame retardants include halogenated flame retardants such as hexabromobiphenyl ether and decabromodiphenyl ether, ammonium polyphosphate, and trimethyl phosphate. Examples of the inorganic fillers include calcium carbonate, talc, mica, clay, aerosil, silica, aluminum hydroxide, magnesium hydroxide, and silica sand. Another additive may be used alone or in combination of two or more of the additives.

Next, the present invention will be clarified by giving specific examples of the present invention. Note that the present invention is not limited to Examples shown below.

Example 1

Preparation of Graphene;

First, graphene oxide was prepared using the method described in the literature (J. J. Zhu, P. M. Ajayan, et al., Nano Lett., 2012, 12, 844-849).

Specifically, in a 5 L three-necked flask, 1600 mL of a mixed acid (concentrated sulfuric acid: concentrated nitric acid=3:1 (volume ratio)) was put, and 6.3 g of powdery (particle diameter <20 μm) graphite (manufactured by Sigma-Aldrich Co. LLC.) was further put. Subsequently, a Dimroth condenser was set in one opening of the three-necked flask, and a three-way cock in a closed state was set in the remaining openings. In the state, the mixture was heated to 120° C. in an oil bath while stirred with a magnetic stirrer under an air atmosphere with cooling water flowing and was reacted for 24 hours. The resulting reaction product was diluted with 2 L of ion exchanged water. Thereafter, the diluted solution was neutralized with sodium carbonate until the pH of the diluted solution was close to 8 to obtain a neutralized solution. The neutralized solution was put in a dialysis bag and subjected to a dialysis for 3 days, a neutralized salt and the like were removed, and the resulting treated solution was dried to obtain 2.5 g of graphene oxide.

Using the graphene oxide prepared as described above, the graphene represented by Formula 13 shown above was synthesized.

Specifically, a stirrer chip was put in a 50 mL eggplant flask equipped with a three-way cock, and baking was performed with a heat gun while argon gas was flowing. After cooling, in a dry box, 152 mg of the graphene oxide prepared as described above was weighed into the eggplant flask. After the weighing, the eggplant flask was taken from the dry box, then under an argon stream, by syringe operation, 5 mL of oxalyl chloride (manufactured by Sigma-Aldrich Co. LLC.) was added, and 0.1 mL of dry N,N-dimethylformamide (DMF, manufactured by Sigma-Aldrich Co. LLC.) was further added. Next, the mixed solution of the graphene oxide, the oxalyl chloride, and the DMF in the eggplant flask was subjected to an ultrasonic treatment for 3 hours using an ultrasonic treatment device (product number "US-103", manufactured by SND Co., Ltd.). Thereafter, an operation was performed for 4 days in which the mixed solution was heated with warm water at 60° C. while stirred with a stirrer. After the reaction, 5 mL of dry DMF, 5 mL of triethylamine, and 2 mg of 4-methoxybenzylamine were further added into the eggplant flask, and the reaction was further continued with warm water at 80° C. for 4 days under an argon atmosphere. The resulting reaction product was separated with a chloroform/saturated NaCl aqueous solution using a separating funnel, and a chloroform recovery solution was recovered. The chloroform recovery solution was dried with sodium sulfate for 12 hours, and then the chloroform was removed with an evaporator. The resulting product was purified with biobeads (Bio-Beads™ S-X1, manufactured by Bio-Rad Laboratories, Inc.) using tetrahydrofuran as a developing solvent. As a result, 215 mg of the graphene represented by Formula 13 shown above was obtained.

Next, graphene having a number average molecular weight (Mn) of Mn=1,200 was fractionated from the obtained graphene represented by Formula 13 using GPC. Specifically, an eluate obtained using GPC with tetrahydrofuran as a mobile phase was fractionated by a fraction collector. At this time, a fraction corresponding to the desired molecular weight in the whole integral of the elution curve, Mn=1,200 was collected. Then, the fractionated eluate was dried using an evaporator to obtain graphene as a photosensitizer. In the GPC, tetrahydrofuran was used as a mobile phase, and a gel permeation chromatography measuring device (APC system, manufactured by Waters Corporation) and a device equipped with a column (HSP gel HR MB-M) RI detector and a PDA detector were used at room temperature (23° C.). As a calibration sample, standard polystyrene was used for the measurement.

Preparation of Curable Composition;

In a 5 mL sample bottle, 100 parts by weight of a compound having a polymerizable group, 0.5 parts by weight of a photoacid generator, and 0.05 parts by weight of the graphene as a photosensitizer obtained above were mixed, and the mixture was heated to 80° C. and appropriately stirred with a spatula until visually transparent to prepare a liquid curable composition. As the compound having a polymerizable group, a bisphenol A-based epoxy resin (EP828, manufactured by Mitsubishi Chemical Corporation) was used. As the photoacid generator, (tolylcumyl) iodonium tetrakis(pentafluorophenyl)borate (BLUESIL PI2074, manufactured by Bluestar Silicones) was used.

Next, on a glass plate (slide glass product number "S1214", manufactured by Matsunami Glass Ind., Ltd.), a barrier was formed with a cloth tape having a thickness of 150 μm, the obtained liquid curable composition was applied so that the coating thickness was approximately 150 μm, and the coating was irradiated with LED light (100 mW/cm$^2$) having an emission wavelength of 405 nm for 60 seconds or 120 seconds. The curing time was evaluated by the post-curing time after the irradiation with the light. That is, after the irradiation with the light, the coating was observed while cured in a dark place at room temperature, and the progress of the curing was observed by palpation. Immediately after the irradiation with the light, the coating was liquid in the same state as the curable composition before the irradiation with the light and gradually thickened, then a skin was formed on the surface irradiated with the light, and the entire curable composition was cured to be a cured body adhered to the glass plate. The curing time was defined as the time during which the coating was cured to be the cured body. The curing time was measured in both cases where the integrated light amount was 6 J/cm$^2$ and where the integrated light amount was 12 J/cm$^2$. The results are shown in Table 1 below.

Example 2

A curable composition was prepared in the same manner as in Example 1 except that 0.1 parts by weight of the graphene as a photosensitizer was used. In Example 2, the curing time was measured in cases where the integrated light amount was 6 J/cm$^2$, 12 J/cm$^2$, and 24 J/cm$^2$. The results are shown in Table 1 below.

Example 3

In Example 3, graphene oxide was prepared in the same manner as in Example 1.

Using the graphene oxide prepared as described above, the graphene represented by Formula 20 shown below was synthesized. In Formula 20, t-Bu represents a tertiary butyl group.

[Chemical 19]

Formula 20

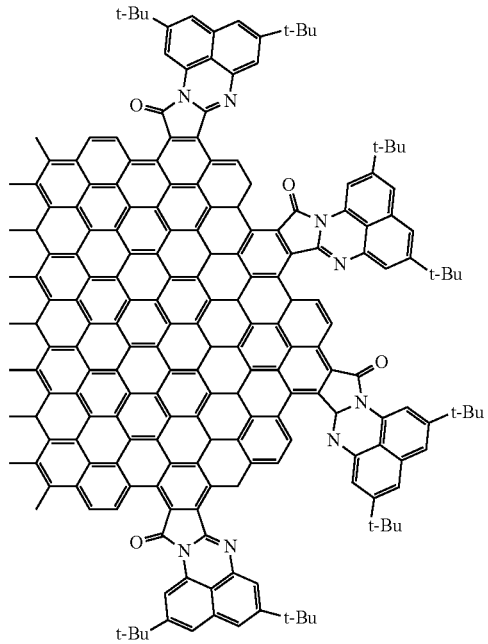

Specifically, a stirrer chip was put in a 50 mL eggplant flask equipped with a three-way cock, and baking was performed with a heat gun while argon gas was flowing. After cooling, in a dry box, 106.5 mg of the graphene oxide prepared in the same manner as in Example 1 was weighed into the eggplant flask. After the weighing, the eggplant flask was taken from the dry box, then under an argon stream, by syringe operation, 5 mL of oxalyl chloride (manufactured by Sigma-Aldrich Co. LLC.) was added, and 0.10 mL of dry N,N-dimethylformamide (DMF, manufactured by Sigma-Aldrich Co. LLC.) was further added. Next, the mixed solution of the graphene oxide, the oxalyl chloride, and the DMF in the eggplant flask was subjected to an ultrasonic treatment for 3 hours using an ultrasonic treatment device (product number "US-103", manufactured by SND Co., Ltd.). Thereafter, an operation was performed for 4 days in which the mixed solution was heated with warm water at 60° C. while stirred with a stirrer. After the reaction, 5 mL of dry DMF, 5 mL of triethylamine, and 466 mg of 3,6-di-tert-butyl-naphthalene-1,8-diamine were further added into the eggplant flask, and the reaction was further continued with warm water at 80° C. for 5 days under an argon atmosphere. The resulting reaction product was separated with an ethyl acetate/saturated NaCl aqueous solution using a separating funnel, and an ethyl acetate recovery solution was recovered. The ethyl acetate recovery solution was dried with sodium sulfate for 12 hours, then the ethyl acetate was removed with an evaporator, and the resulting product was purified with a biobead column (developing solvent: THF) to obtain 80.3 mg of the graphene represented by Formula 20 shown above.

Next, graphene having a number average molecular weight (Mn) of Mn=1,400 was fractionated from the obtained graphene represented by Formula 20 using GPC. Specifically, an eluate obtained using GPC with tetrahydrofuran as a mobile phase was fractionated by a fraction collector. At this time, a fraction corresponding to the desired molecular weight in the whole integral of the elution curve, Mn=1,400 was collected. Then, the fractionated eluate was dried using an evaporator to obtain graphene as a photosensitizer. In the GPC, tetrahydrofuran was used as a mobile phase, and a gel permeation chromatography measuring device (APC system, manufactured by Waters Corporation) and a device equipped with a column (HSP gel HR MB-M) RI detector and a PDA detector were used at room temperature (23° C.). As a calibration sample, standard polystyrene was used for the measurement.

A curable composition was prepared in the same manner as in Example 1 except that the graphene obtained as described above was used as a photosensitizer. In Example 3, the curing time was measured in a case where the integrated light amount was 6 J/cm². The results are shown in Table 1 below.

Comparative Example 1

A composition was prepared in the same manner as in Example 1 except that isopropylthioxanthone (manufactured by Tokyo Chemical Industry Co., Ltd.) was used instead of the graphene as a photosensitizer. In Comparative Example 1, the curing time was measured in a case where the integrated light amount was 6 J/cm². The results are shown in Table 1 below.

Comparative Example 2

A composition was prepared in the same manner as in Example 1 except that no graphene as a photosensitizer was used. In Comparative Example 2, the curing time was measured in a case where the integrated light amount was 24 J/cm². The results are shown in Table 1 below.

Comparative Example 3

A composition was prepared in the same manner as in Example 1 except that 0.5 parts by weight of anthracene (manufactured by Tokyo Chemical Industry Co., Ltd.) was used instead of the graphene as a photosensitizer. In Comparative Example 3, the curing time was measured in a case where the integrated light amount was 24 J/cm². The results are shown in Table 1 below. The number average molecular weight of the anthracene measured by GPC was Mn=178.

Comparative Example 4

A composition was prepared in the same manner as in Example 1 except that 0.5 parts by weight of expanded graphite (trade name "PF-Z", manufactured by TOYO TANSO CO., LTD.) was used instead of the graphene as a photosensitizer. In Comparative Example 4, the curing time was measured in a case where the integrated light amount was 24 J/cm². The results are shown in Table 1 below. The expanded graphite did not dissolve in tetrahydrofuran, and it was impossible to measure the number average molecular weight by GPC.

TABLE 1

| | | Example 1 | Example 2 | Example 3 | Comparative Example 1 | Comparative Example 2 | Comparative Example 3 | Comparative Example 4 |
|---|---|---|---|---|---|---|---|---|
| Compound having cationically polymerizable group | EP828 (part by weight) | 100 | 100 | 100 | 100 | 100 | 100 | 100 |
| Photoacid generator | PI2074 (part by weight) | 0.5 | 0.5 | 0.5 | 0.5 | 0.5 | 0.5 | 0.5 |
| Photosensitizer | Graphene (part by weight), Mn = 1,200 | 0.05 | 0.1 | | | | | |
| | Graphene (part by weight), Mn = 1,400, Formula 20, R = tBu group | | | 0.05 | | | | |
| | Isopropylthioxanthone (part by weight) | | | | 0.05 | | | |
| | Anthracene (part by weight), Mn = 178 | | | | | | 0.5 | |
| | Expanded graphite (PF-Z) (part by weight), (Mn: impossible to measure by GPC) | | | | | | | 0.5 |
| Integrated light amount (J/cm²) | | 6    12 | 6    12    24 | 6 | 6 | 24 | 24 | 24 |
| Curing time (hour) | | 8    5 | 5    3    2 | 6 | 12 | 24 | Not cured after 7 days | Not cured after 7 days |

Example 4

Preparation of Curable Composition;

In a 5 mL sample bottle, 100 parts by weight of a compound having a radically polymerizable group, 3 parts by weight of a radical generator, and 1 part by weight of the graphene as a photosensitizer obtained in the same manner as in Example 1 were mixed, and the mixture was heated to 80° C. and appropriately stirred with a spatula until visually transparent to prepare a liquid curable composition. As the compound having a polymerizable group, polypropylene glycol monoacrylate (AP-400, manufactured by NOF CORPORATION) was used. As the radical generator, (tolylcumyl)iodonium tetrakis(pentafluorophenyl)borate (BLUESIL PI2074, manufactured by Bluestar Silicones) was used.

Next, the obtained liquid curable composition was bubbled with nitrogen gas for 5 minutes, and then the sample bottle was sealed, put down sideways, and irradiated with LED light (100 mW/cm$^2$) having an emission wavelength of 405 nm. After the irradiation for a predetermined time, the sample bottle was set up and the liquid curable composition was cured in a state where it did not flow to the bottom of the sample bottle. At the lowest irradiation required for the curing, the minimum integrated light amount required for curing was determined by the product of the irradiation time (seconds) and the irradiation intensity (mW/cm$^2$). The results are shown in Table 2 below.

Examples 5 and 6 and Comparative Examples 5 to 9

A curable composition was prepared and the minimum integrated light amount required for curing was determined in the same manner as in Example 4 except that the type of the photosensitizer, the type and the amount of the radical generator, and the type of the compound having a radically polymerizable group were changed as shown in Table 2 below. In Examples 5 and 6, the graphene obtained in the same manner as in Example 3 was used as a photosensitizer. In Examples 5 and 6 and Comparative Examples 8 and 9, benzoyl peroxide (wetted with about 25% water, manufactured by Tokyo Chemical Industry Co., Ltd.) was used as a radical generator. In Example 6 and Comparative Example 9, 4-acryloylmorpholine (manufactured by Tokyo Chemical Industry Co., Ltd.) was used as the compound having a radically polymerizable group.

TABLE 2

| | | Example 4 | Comparative Example 5 | Comparative Example 6 | Comparative Example 7 | Example 5 | Comparative Example 8 | Example 6 | Comparative Example 9 |
|---|---|---|---|---|---|---|---|---|---|
| Compound having radically polymerizable group | Polypropylene glycol monoacrylate (AP-400) (part by weight) | 100 | 100 | 100 | 100 | 100 | 100 | | |
| | Acryloylmorpholine (part by weight) | | | | | | | 100 | 100 |
| Radical generator | PI2074 (part by weight) | 3 | 3 | 3 | 3 | | | | |
| | Benzoyl peroxide (about 25% by weight of water content) (part by weight) | | | | | 1 | 1 | 1 | 1 |
| Photosensitizer | Graphene (part by weight), Mn = 1,200 | 1 | | | | | | | |
| | Graphene (part by weight), Mn = 1,400, Formula 20, R = tBu group | | | | | 1 | | 1 | |
| | Isopropylthioxanthone (part by weight) | | 1 | | | | 1 | | 1 |
| | Anthracene (part by weight), Mn = 178 | | | 1 | | | | | |
| | Expanded graphite (PF-Z) (part by weight), (Mn: impossible to measure by GPC) | | | | 1 | | | | |
| Minimum integrated light amount required for curing (J/cm$^2$ @ 405 nm) | | 2 | 3 | Not cured in case where > 10 | Not cured in case where > 10 | 2 | 3 | 1 | 2 |

The invention claimed is:

1. A photosensitizer comprising graphene, the graphene having a number average molecular weight (Mn) in terms of polystyrene of 500 or more and 1,000,000 or less, the number average molecular weight measured by gel permeation chromatography, wherein the graphene has a surface modified with a functional group represented by the following Formula 14,

[Chemical Formula 1]

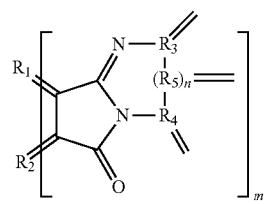

Formula 14 wherein $R_1$ and $R_2$ represent carbon derived from an aromatic ring in the graphene, $R_3$ to $R_5$ represent carbon derived from an aromatic ring or a heterocyclic ring in a group having the aromatic ring or the heterocyclic ring, n is 0 or 1, and m is the number of the functional groups.

2. An active energy ray-curable composition comprising:

a compound having a polymerizable group;

a photoacid generator; and the photosensitizer according to claim 1.

3. The active energy ray-curable composition according to claim 2, wherein the compound having a polymerizable group is a compound having a cationically polymerizable group.

4. The active energy ray-curable composition according to claim 2, wherein the compound having a cationically polymerizable group is an epoxy resin.

5. The active energy ray-curable composition according to claim 2, wherein the photoacid generator is a diaryliodonium salt-based compound.

6. An active energy ray-curable composition comprising:
a compound having a polymerizable group;
a radical generator; and
the photosensitizer according to claim 1.

7. The active energy ray-curable composition according to claim 6, wherein the polymerizable group is a free radical polymerizable group.

8. The active energy ray-curable composition according to claim 7, wherein the free radical polymerizable group is a (meth)acryloyl group.

9. The active energy ray-curable composition according to claim 6, wherein the radical generator is a diaryliodonium salt-based compound or an organic peroxide.

* * * * *